United States Patent
Sandberg et al.

(10) Patent No.: US 7,389,858 B2
(45) Date of Patent: Jun. 24, 2008

(54) DISK BRAKE WITH ADJUSTMENT DEVICE

(75) Inventors: Stefan Sandberg, Lomma (SE); Lars Severinsson, Hishult (SE)

(73) Assignee: Haldex Brake Products AB (SE)

( * ) Notice: Subject to any disclaimer, the term of this patent is extended or adjusted under 35 U.S.C. 154(b) by 23 days.

(21) Appl. No.: 11/330,491

(22) Filed: Jan. 12, 2006

(65) Prior Publication Data

US 2006/0163011 A1 Jul. 27, 2006

(30) Foreign Application Priority Data

Jan. 24, 2005 (DE) .................. 10 2005 003 223

(51) Int. Cl.
*F16D 55/02* (2006.01)
(52) U.S. Cl. .................. 188/71.9; 188/196 B
(58) Field of Classification Search ............. 188/72.9, 188/71.8, 71.7, 71.9, 196 F, 196 P, 196 B, 188/196 A, 196 D, 196 V
See application file for complete search history.

(56) References Cited

U.S. PATENT DOCUMENTS

| | | | | |
|---|---|---|---|---|
| 3,059,731 A | * | 10/1962 | Gancel et al. | 188/71.9 |
| 3,709,333 A | * | 1/1973 | Buyze | 188/71.9 |
| 5,449,052 A | * | 9/1995 | Macke et al. | 188/71.9 |
| 5,819,884 A | * | 10/1998 | Giering | 188/71.9 |
| 6,488,132 B2 | * | 12/2002 | Matsuishi | 188/73.39 |
| 2004/0026181 A1 | * | 2/2004 | Baumgartner et al. | 188/71.7 |

FOREIGN PATENT DOCUMENTS

| | | |
|---|---|---|
| DE | 43 23 292 | 1/1995 |
| DE | 94 10 454 | 12/1995 |
| DE | 195 25 048 | 1/1997 |
| EP | 0 614 025 | 9/1994 |
| EP | 0 730 107 | 9/1996 |
| WO | WO 91/19115 | 12/1991 |

OTHER PUBLICATIONS

European Search Report; May 8, 2006; 2 pages.

* cited by examiner

*Primary Examiner*—Robert A. Siconolfi
*Assistant Examiner*—Vu Q Nguyen
(74) *Attorney, Agent, or Firm*—St. Onge Steward Johnston & Reens LLC

(57) ABSTRACT

The present invention relates to a disc brake having a housing, a clamping device, a push rod, and a self-activating adjustment device, whereby the adjustment device includes a first subassembly and a second subassembly. According to the invention the adjustment device includes an assembling joint, which makes possible the transmission of a rotary motion from the first subassembly to the second subassembly, whereby the assembling joint allows an axial relative motion between the first subassembly and the second subassembly, whereby the assembling joint permits an axial relative motion between the first subassembly and the second subassembly of the adjustment device. According to a particular embodiment of the invention, a misalignment of the push rod inside a place, which lies parallel to the brake disc, can occur with respect to the housing, without resulting in jamming of the cylindrical element with respect to the push rod and housing.

20 Claims, 2 Drawing Sheets

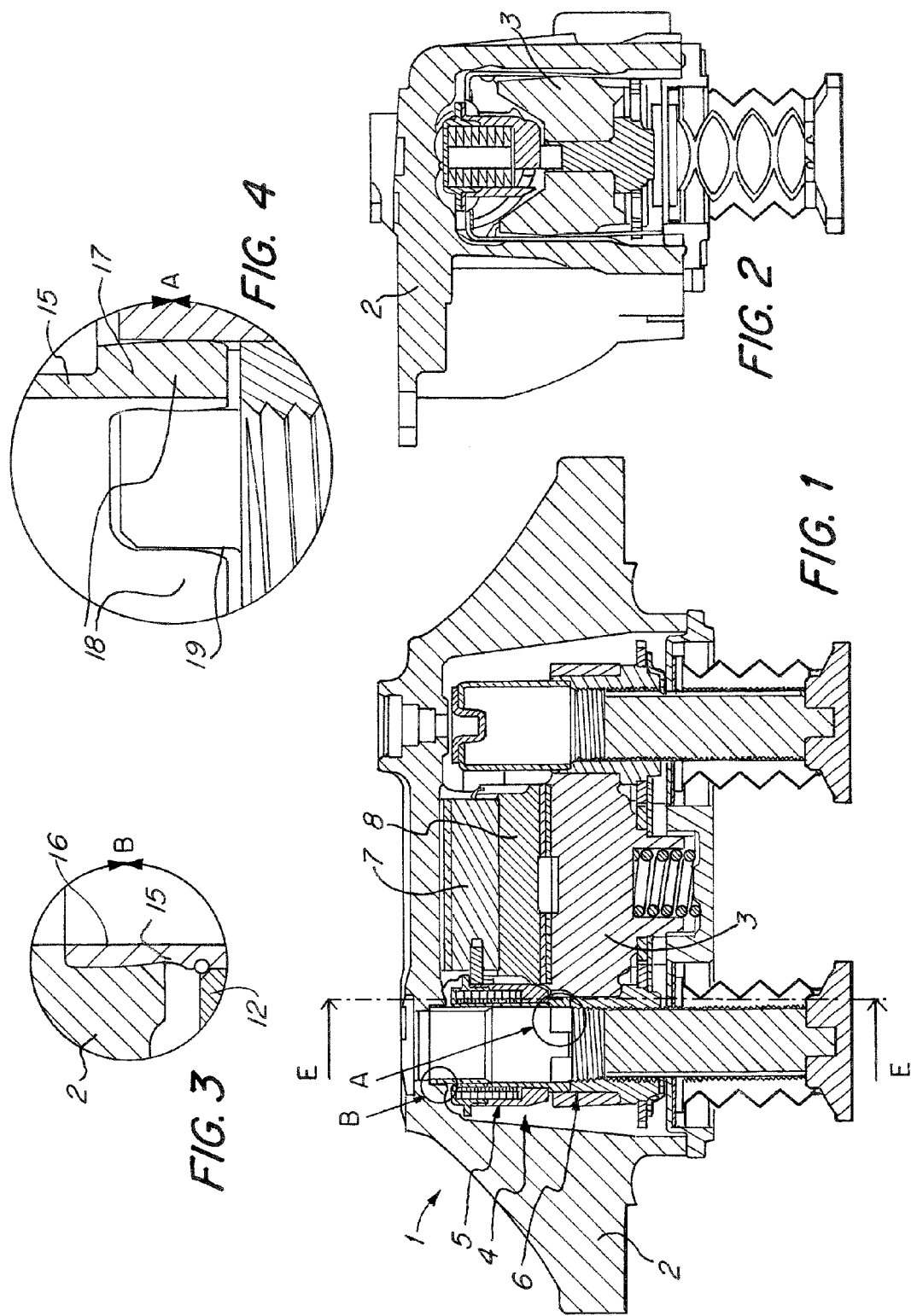

DISK BRAKE WITH ADJUSTMENT DEVICE

CROSS-REFERENCE TO RELATED APPLICATIONS

This application claims priority of German Patent Application No. 10 2005 003 223.0 filed Jan. 24, 2005.

FIELD OF THE INVENTION

The present invention relates to disc brakes with a housing, a clamping device, a push rod, and a self-activating adjustment device.

BACKGROUND OF THE INVENTION

Publication WO 91/19115 describes a disc brake with a self-activating adjustment device. The clamping device of this disc brake contains a cam lever, which can rotate around an axis parallel to the brake disc plane and works jointly by way of a cross tie rod with one or two adjusting spindles, against which a brake lining is supported. Both adjusting spindles are coupled by means of a toothed belt. Protruding into an opening in one adjusting spindle is a rotary drive, which can be driven by the cam lever and, during the engaging stroke, causes screwing motion of one adjusting spindle and thereby, by the toothed belt, also of the other adjusting spindle in the direction approaching the brake disc. The rotary drive contains a one-way coupling as well as a torque-limiting coupling, through which a screwing motion of the adjusting spindles is prevented during the firm braking stroke and the releasing stroke.

Publication EP 0 730 107 B1 describes a disc brake with a push rod, which extends parallel to the brake disc plane and which, upon activation of a clamping device while twisting a clamping element, presses a brake lining against the brake disc in the direction of the axis of a brake disc. The disc brake has an adjustment device with a one-way coupling and a friction clutch for self-activating, abrasion-dependent adjusting of the free play between the brake lining and the brake disc, so that the entire adjustment device is coupled with the push rod in such a way that, upon braking, it follows its motion in the direction of the brake disc axis.

It is the object of the present invention to design a disc brake with simple means in such a way that a safe-functioning adjustment is ensured.

SUMMARY OF THE INVENTION

This object is fulfilled through a disc brake in accordance with Patent claim 1. The subsidiary claims concern advantageous embodiments of the invention.

In keeping with the invention, the disc brake has an adjustment device with a first subassembly and a second subassembly, so that the adjustment device includes an assembling joint, which makes possible a transmission of a rotary motion from the first subassembly to the second subassembly, so that the assembling joint permits an axial relative motion between the first subassembly and the second subassembly of the adjustment device. A coupling of this type can be configured, for instance, as a claw clutch, so that the transmission of a rotary motion from the first subassembly to the second subassembly is made possible, if at the same time an axial relative motion occurs between the first subassembly and the second subassembly of the adjustment device.

This assembling joint makes it possible for the second subassembly of the adjustment device to move in axial direction relatively to the first subassembly of the adjustment device upon activation of the brake and/or upon adjustment. In this way the first subassembly can, for instance, be mounted in the housing, so that the second subassembly is positioned on the push rod, which moves toward the brake disc upon activation of the brake. The manner of functioning of the first subassembly is thus independent of the motions of the push rod. In addition, the vibrations occurring upon brake activation through contact between the brake disc and the brake lining, cannot so easily be transmitted to the first subassembly and thus cannot adversely affect the adjustment function.

The assembling joint preferably allows a clear-cut transmission of the rotary motion, that is, clear-cut connection of the rotary motions of the first subassembly in relation to the second subassembly both in a rotation in one direction as well as in a rotation in the opposite direction.

The first subassembly of the adjustment device preferably has a cylindrical element, which is positioned between the housing and the push rod. According to a particular embodiment of the invention, a misalignment of the push rod is possible within a plane lying parallel to the brake disc, with respect to the housing, without resulting in jamming of the cylindrical element with respect to the push rod and housing. Such a misalignment of the push rod can arise because of the strong forces developing upon activation of the brake, especially if the brake lining wares unevenly. Because misalignment of the push rod is possible without jamming the cylindrical element or the adjustment device, secure functioning of the adjustment is ensured, although the second subassembly of the adjustment device moves relatively with respect to the first subassembly because of the misalignment, with the result that the axes of the subassemblies of the adjustment device are not tipped parallel and/or toward one another.

Jamming of the cylindrical element or of the adjustment device can be avoided in various ways. First, it is possible that jamming of the cylindrical element is avoided if positioning its first end in the housing and positioning its second end in the push rod each allows a tipping motion. This can be achieved if the ends each have a convex curvature or a spherical surface, which extends preferably over the entire area of the cylindrical element at each end. It can, however, have a disc provided at each of its ends, so that with the housing or with the push rod only a line-shaped motion occurs. The corresponding insertion or mounting of the housing or the push rod can simply be a cylindrical indentation or a concave curvature or an adapted spherical surface, in order to work together with the particular end of the cylindrical element in such a way that it is possible to tip the cylindrical element without jamming. To ensure that the possible interlocking of the assembling joint causes no jamming, the flanks of the tooth or teeth can also have a corresponding arch or spherical surface or a correspondingly large tooth play for the related tooth gaps to allow tipping to occur.

Alternatively, however, it is also possible that the first end cannot be tipped toward the housing. In this case the second end of the cylindrical element must have a sufficient play with respect to the push rod in order to allow a misalignment of the push rod with respect to the housing without jamming the cylindrical element or the adjustment device. To ensure in this case that any possible interlocking of the assembling joint causes no jamming, the flanks of the tooth or teeth can also have a correspondingly large tooth play for the related tooth gaps.

The assembling joint, in particular a possible interlocking of the assembling joint, should preferably allow a non-jamming transmission of a rotary motion even when the axle of the first subassembly is not coaxial and/or not parallel to the axle of the second subassembly.

The adjustment device preferably includes a one-way coupling and a friction clutch, which both can be part of the first subassembly of the adjustment device. Both the one-way coupling and the friction clutch can be configured as looped springs.

Upon activating the clamping device, a rotary motion of an adjustment housing, which is part of the first subassembly, can advantageously be effected, in particular by means of a drive pivot or drive gear, which is moved together with the clamping device. Here the first subassembly can include a transmission sleeve, which is connected with the adjustment housing by way of a friction clutch, and which is connected with the cylindrical element by the one-way coupling. It is especially advantageous if the transmission sleeve has an inner hollow space so that at least partial segments of the one-way coupling and/or the friction clutch can be positioned in it. In this way a very compact structure can be achieved in the axial direction, especially if both the one-way coupling and the friction clutch are configured as looped springs and if the one-way coupling is positioned radially inside the friction clutch, or vice versa.

The second subassembly of the adjustment device preferably includes an adjustment sleeve with inward threading and an adjustment screw situated therein, so that the adjustment sleeve with inward threading is positioned on the push rod. The adjustment screw is secured against turning, so that a rotary motion that might be transmitted by the assembling joint results in an axial displacement of the thread spindle.

If an eccentric mechanism is provided as clamping device, it is advantageous if a concentrically positioned securing pin is provided in the axle of the eccentric mechanism to secure the first subassembly in axial direction with respect to the housing and in particular to stand in connection with the transmission sleeve. The transmission sleeve here includes, extending in the peripheral direction, an indentation or groove or a collar, in which the securing pin engages, so that it is possible to rotate the transmission sleeve while it is axially fixed in place. In this manner the installation of the disc brake is simplified, because thanks to the incorporation of the eccentric mechanism an axial securing of the transmission sleeve or of the first subassembly is achieved at the same time.

The embodiments of the invention are further explained hereafter with reference to the following illustrations.

BRIEF DESCRIPTION OF THE DRAWINGS

FIG. 1 shows a cross-section view of an embodiment of a disc brake according to the present invention.

FIG. 2 shows a cross-section view in relation to the dividing line E-E of FIG. 1.

FIG. 3 shows an enlarged view of detail B of FIG. 1.

FIG. 4 shows an enlarged view of detail A of FIG. 1.

DETAILED DESCRIPTION OF THE INVENTION

Figure 5:
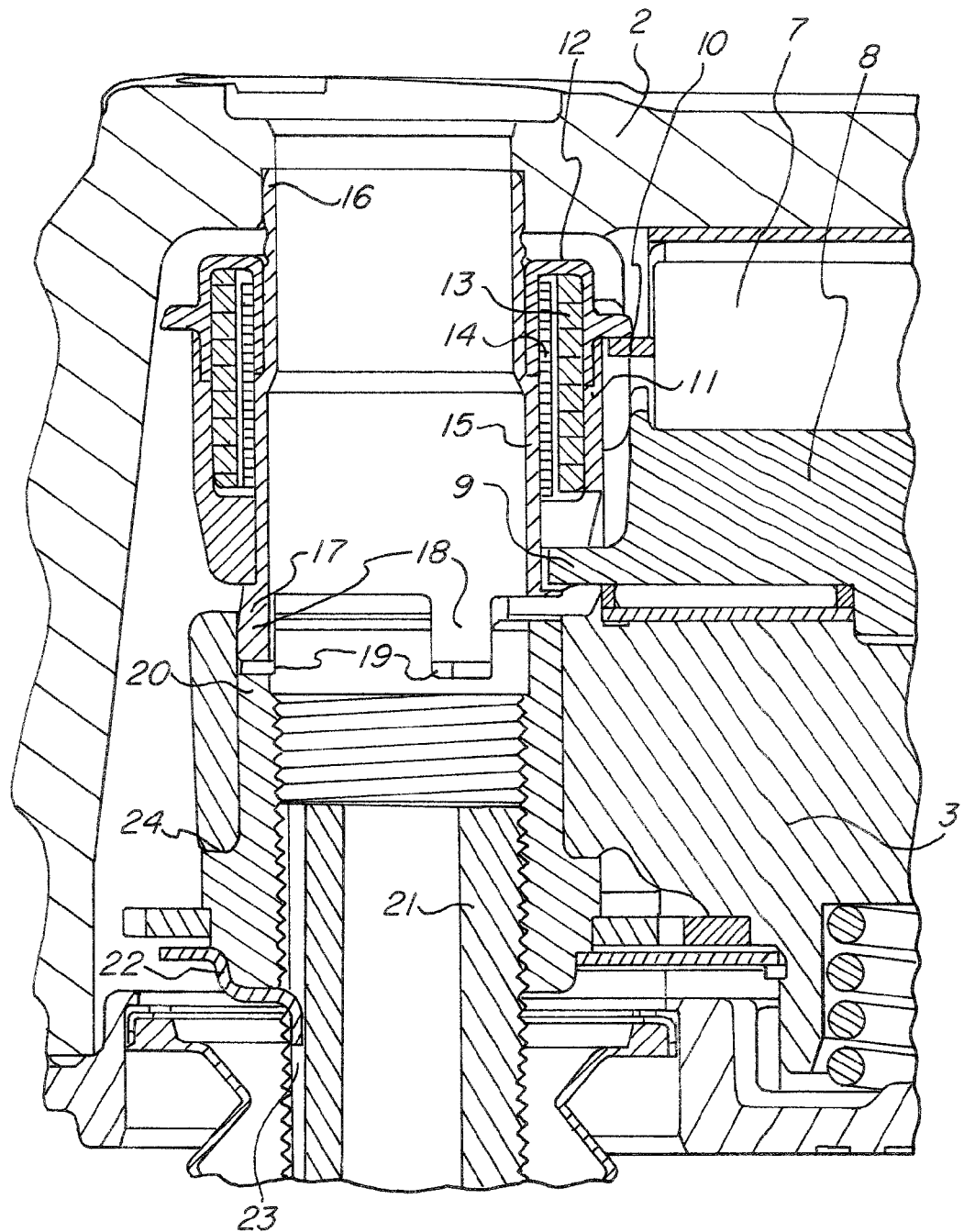
FIG. 5 shows an enlarged view of a cross-section in the area of the adjustment device of a disc brake according to FIG. 1.

FIGS. 1 and 2 show a disc brake 1 with a housing, a clamping device that includes an eccentric mechanism 7, 8, a push rod 3, and a self-activating, abrasion-dependent adjustment device 4, said adjustment device 4 including a first subassembly 5 and a second subassembly 6. The adjustment device 4 has an assembling joint, which makes possible a transmission of a rotary motion from the first subassembly 5 to the second subassembly 6, so that the assembling joint allows an axial relative motion between the first subassembly 5 and the second subassembly 6 of the adjustment device 4.

In the illustrated embodiment, this assembling joint is configured as a claw clutch whose four teeth 18 of the first subassembly 5 engage with corresponding tooth gaps 19 of the second subassembly 6, as seen in FIG. 4, which shows an enlarged view of detail A of FIG. 1. The four teeth 18 of the claw clutch are configured on the lower end 17 of a cylindrical element 15, which is a component of the first subassembly 4. Because the teeth 18 are positioned around the periphery of the cylindrical element 15, the right-side tooth 18 in FIG. 4 is presented in sectional view and the left-side tooth 18 in FIG. 4 is shown looking from the inside of the cylindrical element 15.

Because of the claw clutch, the transmission of a rotary motion from the first subassembly 5 to the second subassembly 6 is possible if at the same time an axial relative motion follows between the first subassembly 5 and the second subassembly 6 of the adjustment device 4. Thus it becomes possible that the second subassembly 6 of the adjustment device 4, upon activation of the brake and/or upon adjustment, can make a relative motion with respect to the first subassembly 5 of the adjustment device 4. In this manner the first subassembly 5, for instance, can be positioned in the housing 2, as can be seen in FIG. 1, and the second subassembly 6 can be positioned on the push rod 3, which, upon activation of the brake, moves toward the (not illustrated) brake disc (in FIG. 1, that is, downward). The way that the first subassembly 5 functions is therefore dependent on the motions of the push rod 3. In addition, vibrations, which occur upon activation of the brake through contact between the brake disc and the brake lining, cannot so easily be transmitted to the first subassembly 5 and thus they impede the adjustment function.

The claw clutch as an adjusting joint makes possible a clear-cut transmission of the rotary motion, that is, a clear-cut link of the rotary motions of the first subassembly 5 to the second subassembly 6 both upon motion in one direction and motion in the opposite direction.

As seen in FIG. 5, the first subassembly 5 of the adjustment device 4 includes a cylindrical element 15, which is positioned between the housing 2 and the push rod 3. In the illustrated embodiment a misalignment of the push rod 3 with a plane lying parallel to the brake disc is possible with respect to the housing 2 (that is, toward the right in FIG. 5) without resulting in jamming of the cylindrical element 15 with respect to the push rod 3 and housing 2. Such a misalignment of the push rod 3 can arise, because of the strong forces developing upon activation of the brake, especially if the wearing of the brake lining has been uneven. Because misalignment of the push rod is possible without jamming of the cylindrical element 15 or of the adjustment device 4, securely functioning adjustment is ensured, although the second subassembly 6 of the adjustment device 4 makes a relative motion with respect to the first subassembly 5 because of the misalignment of the push rod 3, with the result that the axes of the subassemblies 5, 6 of the adjustment device 4 are not parallel and/or are tipped toward one another.

Jamming of the cylindrical element or of the adjustment device can be prevented if the positioning of the first end 16 of the cylindrical element 15 in the housing 2 and the positioning of the second end 17 of the cylindrical element 15 in the push rod 3 each allows a tipping motion. This can be achieved if the ends 16, 17 each have a convex arching or a spherical surface as shown in FIGS. 3 and 4. The convex arching or the spherical surface extends preferably over the entire periphery of the cylindrical element 15 at the end, 16 or 17.

Alternatively, however, a disc can also be provided on each of the ends 16, 17 so that with the housing 2 or with the push rod 3 only one linear contact occurs in each case. The corresponding opening or mounting of the housing 2 or of the push rod 3 here can simply be a spherical opening or a concave arching or an appropriate spherical surface in order to correspond with the respective ends 16, 17 of the cylindrical element 15 in such a way that at both ends 16, 17 tipping of the cylindrical element is possible without jamming.

To ensure that the interlocking of the assembling joint also causes no jamming, the flanks of the teeth 18 also have a corresponding arching or spherical surface. It is also possible, however, to arrange a correspondingly large play in the teeth 18 with respect to the related tooth gaps 19 to permit tipping.

Another alternative possibility is that the first end 16 cannot be tipped toward the housing 2. In this case the second end 17 of the cylindrical element 15 must have sufficient play with respect to the push rod 3 in order to allow for misalignment of the push rod 3 with respect to the housing 2 without jamming of the cylindrical element 15 or of the adjustment device 4. To ensure in this case that any possible interlocking of the assembling joint causes no jamming, the flanks of the tooth or teeth 18 can also have sufficient large play with respect to the related tooth gaps 19.

The assembling joint or the interlocking of the assembling joint makes possible in the illustrated embodiment a transmission, free of jamming, of a rotary motion even when the axle of the first subassembly 5 is not coaxial and/or not parallel with respect to the axle of the second subassembly 6.

As can be seen in FIG. 5, the adjustment device of the embodiment includes a one-way coupling 14 and a friction clutch 13, both of which are associated with the first subassembly 5 of the adjustment device 4. Both the one-way coupling 14 and the friction clutch 13 can be configured as looped springs. Upon activation of the clamping device, that is of the eccentric mechanism 7, 8, a rotary motion of an adjustment housing 11 is produced, in that a drive pivot or drive gear 9, which is activated jointly with the clamping device, moves approximately within a plane lying parallel to the brake disc. In FIG. 5 the drive pivot or drive gear 9 therefore moves perpendicularly to the illustrated plane, because the eccentric mechanism 8 is rotated around the axle drive shaft 7.

The rotary motion of the adjustment housing 11, which is thus introduced upon activation of the brake, is transmitted by the friction clutch 13 to the transmission sleeve 12, which is positioned rotatably, but is axially fixed in place by a securing pin 10 that is positioned concentrically in the axle drive shaft 7 of the eccentric mechanism in the illustrated embodiment. Upon activation of the brake the axle drive shaft 7 rotates together with the securing pin 10, without the securing pin 10 moving in the axial direction because of its concentric positioning. The transmission sleeve 12 here includes a collar that extends in the direction of the periphery, the direction in which the securing pin engages, so that rotation of the transmission sleeve 12 is possible with the axial securing. In this manner the installation of the disc brake is simplified, because an axial securing of the transmission sleeve 12 or of the first subassembly 5 is achieved simultaneously thanks to the incorporation of the eccentric mechanism.

The rotation of the transmission sleeve 12 is transmitted by the one-way coupling 14 to the cylindrical element 15, and from the cylindrical element 15 by the claw clutch or assembling joint to an adjustment sleeve 20 with inward threading.

An adjustment screw 21 is also foreseen, which stands engaged with the inward threading of the adjustment sleeve 20. The adjustment screw 21 includes a groove 23 running parallel to its axis, in which a pivot or gear 22 engages, so that the adjustment screw 21 cannot rotate with respect to the push rod 3. Therefore if a rotary motion is transmitted by the assembling joint to the adjustment sleeve 20, then, because of the rotation-proof positioning of the adjustment screw 21, the adjustment screw 21 is unscrewed.

At normal brake activation, of course, a rotary motion is introduced in the adjustment housing 11. Through the activation of the clamping device, however, the push rod 3 is moved in the direction of the brake disc past the normal ventilation play, so that upon further motion the brake disc produces a very strong counter-force by means of the brake shoe and the adjustment screw 21. At normal brake activation therefore a self-correction occurs in relation to a rotary motion of the adjustment sleeve 20, because the restraining friction in a contact surface 24 between the adjustment sleeve 20 and the push rod 3 prevents rotation of the adjustment sleeve 20 because of the strong counter-force of the brake disc. Upon further activation of the clamping device, the adjustment housing rotates further, but the friction clutch 13 simply pushes forward, so that no further rotation of the transmission sleeve 12 and of the related elements of the adjustment device occurs. It becomes clear here that the looped spring is wound as a friction clutch 13 in such a way that a rotation of the adjustment housing, corresponding to activation of the brake, would cause a reduction of the diameter of the looped spring 13 if the upper end of the looped spring 13 shown in FIG. 5 were secured in place.

On releasing the brake, the adjustment housing 11 rotates in the opposite direction. However, this does not cause the cylindrical element 15 to turn back, because the second looped spring as a one-way coupling 14 cannot transmit any notable torque in the opposite direction, since in this direction the result would be a winding up of the looped spring 14 if the upper end of the looped spring illustrated in FIG. 5 were secured in place.

If there is excessive wear of the brake lining, the result upon brake activation is a greater rotation of the adjustment device 4 than is customary with normal brake activation. The adjustment screw 21 is thus rotated out of the adjustment sleeve 20 until a self-correction takes place by means of the surface 24. Reversal of this adjustment is prevented by the one-way coupling 14.

It is particularly advantageous if the transmission sleeve 21, as shown in FIG. 5, includes an interior hollow space so that partial segments of the one-way coupling and of the friction clutch are positioned within it. In this manner a very compact structure can be achieved in the axial direction, especially if the one-way coupling 14 as well as the friction clutch 13 are configured as looped springs and if the one-way coupling 14 is positioned radially inside the friction clutch 13 or vice versa.

At the right-hand side in FIG. 1 a second adjustment sleeve with a second adjustment screw is shown. Rotation of the first adjustment sleeve 20 can be transmitted to the second adjustment sleeve by pinions and a toothed belt, so that simultaneous adjustment takes place. According to the invention, however, it is also possible to present a single adjustment spindle, which in particular is positioned centrally in the push rod.

In the embodiment an eccentric mechanism is foreseen as a clamping device. As specialists are aware, however, a ball-and-ramp mechanism can be foreseen with the same effectiveness as a clamping device.

What is claimed is:

1. A disc brake having a housing, a clamping device, a push rod, and a self-activating adjustment device, wherein the adjustment device includes a first subassembly and a second subassembly, characterized in that the adjustment device includes an assembling joint, which makes possible the transmission of a rotary motion from the first subassembly to the second subassembly, and which allows an axial relative motion between the first subassembly and the second subassembly of the adjustment device;

wherein the first subassembly comprises a cylindrical element arranged between the housing and the push rod, the cylindrical element including a first end having a surface in contact with a surface of the housing and a second end having a surface in contact with a surface of the push rod;

wherein at least one of the surface of the first end of the cylindrical element and the surface of the housing has a convex arching or spherical shape so as to allow a tipping motion of the cylindrical element with respect to the housing without jamming of the cylindrical element with respect to the housing during brake actuation; and wherein at least one of the surface of the second end of the cylindrical element and the surface of the push rod has a convex arching or spherical shape so as to allow a tipping motion of the cylindrical element with respect to the push rod without jamming of the cylindrical element with respect to the push rod during brake actuation.

2. A disc brake according to claim 1, characterized in that the assembling joint makes possible the transmission of a rotary motion from the first subassembly to the second subassembly if simultaneously an axial relative motion occurs between the first subassembly and the second subassembly of the adjustment device.

3. A disc brake according to claim 2, characterized in that the assembling joint comprises a claw clutch for transmission of a rotary motion from the first subassembly to the second subassembly.

4. A disc brake according to claim 1, characterized in that, upon brake activation, a misalignment of the push rod inside a plane lying parallel to a brake disc is possible with respect to the housing, without causing jamming of the cylindrical element with respect to the push rod and housing.

5. A disc brake according to claim 4, characterized in that when the cylindrical element is tipped with respect to the housing and with respect to the push rod, the cylindrical element is able to transmit rotary motion without jamming.

6. A disc brake according to claim 4, characterized in that the surface of the second end of the cylindrical element includes play with respect to the surface of the push rod.

7. A disc brake according to claim 4, characterized in that the cylindrical element is able to transmit rotary motion without jamming when an axis of the first subassembly is not coaxial with an axis of the second subassembly.

8. A disc brake according to claim 7, characterized in that the cylindrical element is able to transmit rotary motion without jamming when the axis of the first subassembly is not parallel to the axis of the second subassembly.

9. A disc brake according to claim 8, characterized in that the second subassembly of the adjustment device is coupled with the push rod, which is pressed in the direction of the brake disc upon brake activation of the clamping device.

10. A disc brake according to claim 9, characterized in that the adjustment device includes a one-way coupling, which is configured as a looped spring, and which is associated with the first subassembly of the adjustment device.

11. A disc brake according to claim 10, characterized in that the adjustment device includes a friction clutch, which is configured as a looped spring, and which is associated with the first subassembly of the adjustment device.

12. A disc brake according to claim 11, characterized in that upon activation of the clamping device, a rotary motion of an adjustment housing is introduced, which is associated with the first subassembly, by means of a drive pivot or drive gear, which is moved together with the clamping device.

13. A disc brake according to claim 12, characterized in that the first subassembly includes a transmission sleeve, which is engaged with the adjustment housing by way of the friction clutch.

14. A disc brake according to claim 13, characterized in that the transmission sleeve is engaged with the cylindrical element by means of the oneway coupling.

15. A disc brake according to claim 14, characterized in that the second subassembly of the adjustment device includes an adjustment sleeve with inner threading and, positioned in it, an adjustment screw, whereby the adjustment sleeve is positioned on the push rod.

16. A disc brake according to claim 15, characterized in that a rotary motion transmitted by the assembling joint results in an axial displacement of the adjustment screw.

17. A disc brake according to claim 16, characterized in that the clamping device is an eccentric mechanism.

18. A disc brake according to claim 17, characterized in that the eccentric mechanism comprises an axis of rotation with a concentrically positioned securing pin disposed therein, which holds the first subassembly in axial direction with respect to the housing, and which is connected with the transmission sleeve.

19. A disc brake according to claim 18, characterized in that the clamping device is a ball-ramp mechanism.

20. A disc brake according to claim 19, characterized in that the assembling joint is a claw clutch.

* * * * *